US012679146B2

(12) United States Patent (10) Patent No.: US 12,679,146 B2
Yao (45) Date of Patent: Jul. 14, 2026

(54) TIRE

(71) Applicant: Sumitomo Rubber Industries, Ltd.,
Hyogo (JP)

(72) Inventor: Masahiro Yao, Kobe (JP)

(73) Assignee: Sumitomo Rubber Industries, Ltd.,
Hyogo (JP)

( * ) Notice: Subject to any disclaimer, the term of this
patent is extended or adjusted under 35
U.S.C. 154(b) by 0 days.

(21) Appl. No.: 18/921,844

(22) Filed: Oct. 21, 2024

(65) Prior Publication Data

US 2025/0135807 A1 May 1, 2025

(30) Foreign Application Priority Data

Oct. 30, 2023 (JP) ................................. 2023-185374

(51) Int. Cl.
  *B60C 11/01* (2006.01)
  *B60C 11/00* (2006.01)
  *B60C 11/03* (2006.01)
(52) U.S. Cl.
  CPC ...... *B60C 11/0309* (2013.01); *B60C 11/0008*
    (2013.01); *B60C 11/01* (2013.01); *B60C*
    *2011/0016* (2013.01); *B60C 2011/0365*
    (2013.01)
(58) Field of Classification Search
  CPC . B60C 11/01; B60C 11/0008; B60C 11/0309;
    B60C 2011/0016; B60C 2011/0365
  See application file for complete search history.

(56) References Cited

U.S. PATENT DOCUMENTS

| | | | | |
|---|---|---|---|---|
| 2019/0176531 A1* | 6/2019 | Murata | ................... | B60C 11/12 |
| 2020/0406688 A1 | 12/2020 | Iwamoto | | |
| 2023/0256777 A1* | 8/2023 | Yukami | ................... | B60C 11/01 |
| | | | | 152/209.16 |

FOREIGN PATENT DOCUMENTS

| | | | | |
|---|---|---|---|---|
| JP | 2000-280711 A | 10/2000 | | |
| JP | 2008195099 A | * 8/2008 | ............. | B60C 11/00 |
| JP | 2021-003948 A | 1/2021 | | |
| KR | 20220080537 A | * 6/2022 | ............. | B29D 30/52 |

OTHER PUBLICATIONS

Extended European Search Report issued in EP 24 20 7401.1-1009
by the European Patent Office on Feb. 25, 2025, which is related to
U.S. Appl. No. 18/921,844.

* cited by examiner

*Primary Examiner* — Justin R Fischer
*Assistant Examiner* — Philip N Schwartz
(74) *Attorney, Agent, or Firm* — Studebaker Brackett
PLLC

(57) ABSTRACT

A tire that allows enhancement of running performance on
a deep snow road surface is provided. A tire 1 includes a first
shoulder block 3. The first shoulder block 3 includes a first
tread surface 5 extending inward from a first tread end T1 in
the tire axial direction, a first side surface 6 extending
inward from the first tread end T1 in the tire radial direction,
and a second tread surface 7 extending outward from the first
side surface 6 in the tire axial direction. The second tread
surface 7 extends at an angle θ of 10° or less relative to a
contact line 5*n* extending in contact with the first tread
surface 5 through the first tread end T1. At least one groove
8 is disposed in the second tread surface 7.

15 Claims, 6 Drawing Sheets

TIRE

BACKGROUND OF THE INVENTION

Field of the Invention

The present invention relates to a tire.

Background Art

Japanese Laid-Open Patent Publication No. 2021-03948 discloses a pneumatic tire which allows running on an off-the-road surface. The pneumatic tire has a side protector that is raised outward in the tire axial direction, in at least one of sidewall portions.

In the pneumatic tire disclosed in Japanese Laid-Open Patent Publication No. 2021-03948, traction tends to become insufficient in running on a deep snow road surface.

The present invention has been made in view of the aforementioned problem, and a main object of the present invention is to provide a tire that allows enhancement of running performance on a deep snow road surface.

SUMMARY OF THE INVENTION

The present invention is directed to a tire including a tread portion. The tread portion includes a first tread end, and at least one first shoulder block including the first tread end. The first shoulder block includes a first tread surface extending inward from the first tread end in a tire axial direction, a first side surface extending inward from the first tread end in a tire radial direction, and a second tread surface extending outward from the first side surface in the tire axial direction. The second tread surface extends at an angle of 10° or less relative to a contact line extending in contact with the first tread surface through the first tread end, on a tire meridional cross section of the first shoulder block. At least one groove is disposed in the second tread surface.

The tire of the present invention has the above-described configurations, and can thus allow enhancement of running performance on a deep snow road surface.

DETAILED DESCRIPTION

Figure 1:
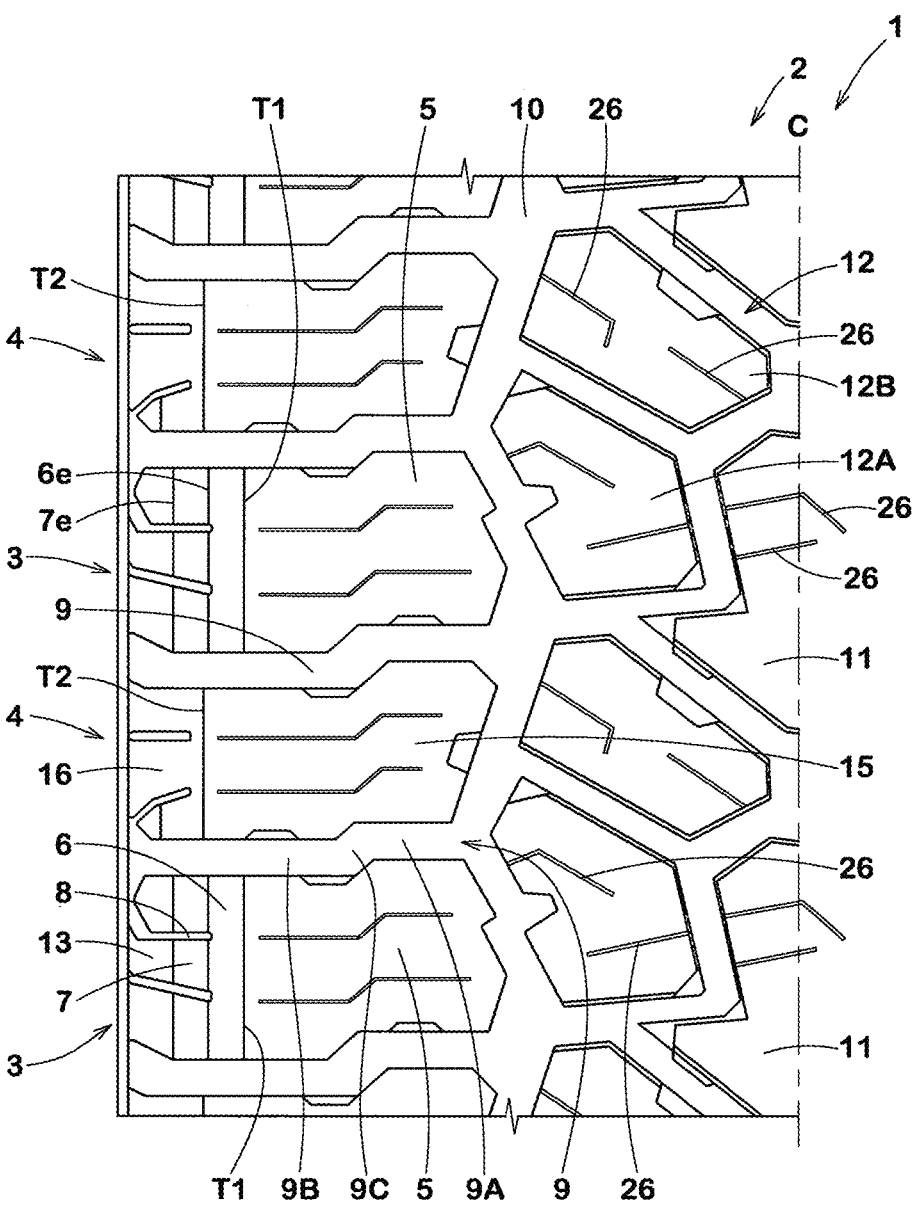
FIG. 1 is a development of a left half of a tread portion of a tire according to one embodiment of the present invention.

An embodiment of the present invention will be described below with reference to the drawings. The drawings include exaggerated expressions and the dimensional ratio in the drawings is expressed so as to be different from that of the actual structure in order to aid in understanding of the present invention. In a case where a plurality of embodiments are described, the same or common components are denoted by the same reference characters throughout the description, and repeated description is omitted.

FIG. 1 is a development of a left half of a tread portion 2 of a tire 1 according to one embodiment of the present invention. The tread portion 2 is, for example, formed to have a pattern that is point-symmetric with respect to any point on the tire equator C. FIG. 1 shows the tire 1, for passenger cars, which is suitably mounted to, for example, a 4WD vehicle that can run on a deep snow road surface as a preferable mode. However, the present invention may be adopted for, for example, a heavy-duty tire 1. The tread portion 2 is not limited to the illustrated configuration.

The tread portion 2 includes a first tread end T1, and at least one first shoulder block 3 including the first tread end T1.

Figure 2:
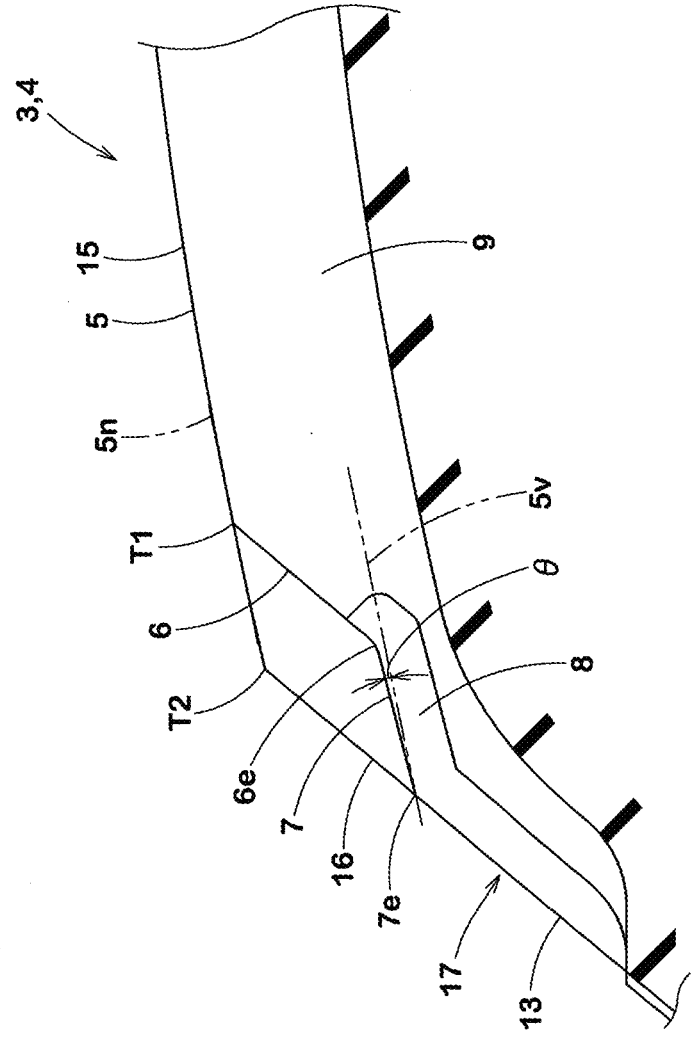
FIG. 2 is a tire meridional cross-sectional view of a first shoulder block.

FIG. 2 is a tire meridional cross-sectional view of the first shoulder block 3. As shown in FIG. 1 and FIG. 2, the first shoulder block 3 includes a first tread surface 5 extending inward from the first tread end T1 in the tire axial direction, a first side surface 6 extending inward from the first tread end T1 in the tire radial direction, and a second tread surface 7 extending outward from the first side surface 6 in the tire axial direction. For example, the first side surface 6 continuously extends outward from the first tread end T1 in the tire axial direction. In the present embodiment, an angle of the second tread surface 7 relative to the tire axial direction is less than an angle of the first side surface 6 relative to the tire axial direction, and the second tread surface 7 is inclined outward in the tire axial direction and inward in the tire radial direction.

On the tire meridional cross section of the first shoulder block 3, the second tread surface 7 extends at an angle $\theta$ of 10° or less relative to a contact line $5n$ extending in contact with the first tread surface 5 through the first tread end T1. Therefore, during running on a deep snow road surface, the second tread surface 7 can densely compress the deep snow. In description herein, the angle $\theta$ represents an absolute value of a difference in angle between the second tread surface 7 and an imaginary contact line $5v$ that is obtained by moving the contact line $5n$ in parallel and causing the contact line $5n$ to intersect the second tread surface 7. For example, the angle $\theta$ is preferably 0°.

At least one groove 8 is disposed in the second tread surface 7. Such a groove 8 allows a strongly compacted snow column to be formed in the groove 8, and allows traction to be enhanced by shearing the snow column. Therefore, the tire 1 of the present invention allows enhancement of running performance on a deep snow road surface. In the present invention, an edge component of the first tread surface 5 is not increased, so that reduction of stiffness of the first tread surface 5 is inhibited, and wear and defects such as chipping can be inhibited. Therefore, the tire 1 of the present embodiment can maintain high wear resistance and high chipping resistance.

As shown in FIG. 1, in the present embodiment, for example, the tread portion 2 includes a second tread end T2 disposed outward of the first tread end T1 in the tire axial direction, and a second shoulder block 4 including the second tread end T2. The tread portion 2 further includes a first shoulder lateral groove 9 that is adjacent to the first shoulder block 3 and extends in the tire axial direction.

The first tread end T1 and the second tread end T2 are ground contact positions on the outermost sides of the tire 1 in the tire axial direction at the blocks 3 and 4, respectively, in a state where a standardized load is applied in the case of a pneumatic tire. The state where a standardized load is applied represents a state where a standardized load is applied to the tire 1 in a standardized state, and the tire 1 is brought into contact with a plane at a camber angle of 0°. The first tread surface 5 is a surface that comes into contact with the plane in the state where a standardized load is applied. The second tread surface 7 is a surface that does not come into contact with the plane in the state where a standardized load is applied.

The "standardized state" represents a state where the tire 1 is mounted on a standardized rim and is inflated to a standardized internal pressure and no load is applied to the tire 1. In the description herein, unless otherwise specified, dimensions and the like of components of the tire 1 are represented as values measured in the standardized state.

The "standardized rim" represents a rim that is defined by a standard for each tire in a case where there is a standard system including the standard on which the tire 1 is based, and is, for example, "standard rim" in the JATMA standard, "Design Rim" in the TRA standard, or "Measuring Rim" in the ETRTO standard.

The "standardized internal pressure" represents an air pressure that is defined by a standard for each tire in a case where there is a standard system including the standard on which the tire 1 is based, and is "maximum air pressure" in the JATMA standard, the maximum value recited in the table "TIRE LOAD LIMITS AT VARIOUS COLD INFLATION PRESSURES" in the TRA standard, or "INFLATION PRESSURE" in the ETRTO standard.

The "standardized load" represents a load that is defined by a standard for each tire in a standard system including the standard on which the tire 1 is based, and is "maximum load capacity" in the JATMA standard, the maximum value recited in the table "TIRE LOAD LIMITS AT VARIOUS COLD INFLATION PRESSURES" in the TRA standard, or "LOAD CAPACITY" in the ETRTO standard.

For example, the first shoulder lateral groove 9 extends outward in the tire axial direction beyond the first tread end T1 and the second tread end T2. Thus, in the present embodiment, the first shoulder lateral groove 9 is adjacent to the first side surface 6 and the second tread surface 7 in the tire circumferential direction.

In the present embodiment, the first shoulder lateral groove 9 includes a first lateral groove portion 9A connected to a circumferential groove 10, a second lateral groove portion 9B connected to the second tread end T2, and a third lateral groove portion 9C connecting between the first lateral groove portion 9A and the second lateral groove portion 9B. For example, the first lateral groove portion 9A and the second lateral groove portion 9B extend in parallel with the tire axial direction. In the present embodiment, the third lateral groove portion 9C is inclined relative to the tire axial direction.

Furthermore, in the present embodiment, the tread portion 2 includes the circumferential groove 10 that continuously extends in the tire circumferential direction so as to zigzag, a plurality of crown blocks 11 disposed on the tire equator C, and middle blocks 12 disposed between the crown blocks 11 and the circumferential groove 10. In the present embodiment, the first shoulder lateral groove 9 is connected to the circumferential groove 10.

In the present embodiment, in the tread portion 2, the first shoulder block 3 and the second shoulder block 4 alternate in the tire circumferential direction. In other words, the first tread end T1 and the second tread end T2 alternate in the tire circumferential direction. In the present embodiment, the first shoulder lateral groove 9 is disposed between the first shoulder block 3 and the second shoulder block 4.

In the present embodiment, the first shoulder block 3 includes a second side surface 13 extending inward from the second tread surface 7 in the tire radial direction. For example, an angle of the second side surface 13 relative to the tire axial direction is greater than the angle of the second tread surface 7 relative to the tire axial direction, and the second side surface 13 extends outward from the second tread surface 7 in the tire axial direction. For example, the first shoulder block 3 further includes a first edge 6e at which the first side surface 6 and the second tread surface 7 intersect each other, and a second edge 7e at which the second tread surface 7 and the second side surface 13 intersect each other. For example, in a case where the first side surface 6 and the second tread surface 7 intersect each other through an arc or a straight line, the first edge 6e is a mid-point of the arc or the straight line on the tire meridional cross section of the first shoulder block 3. The same applies to the second edge 7e.

The second shoulder block 4 includes a third tread surface 15 extending inward from the second tread end T2 in the tire axial direction, and a third side surface 16 extending inward from the second tread end T2 in the tire radial direction. The third tread surface 15 is a surface that comes into contact with the plane in the state where a standardized load is applied. For example, an angle of the third side surface 16 relative to the tire axial direction is greater than the angle of the second tread surface 7 relative to the tire axial direction, and the third side surface 16 extends outward from the second tread end T2 in the tire axial direction. For example, the third side surface 16 has an overlapping portion 17 in which the third side surface 16 and the second side surface 13 overlap each other on the tire meridional cross section of the first shoulder block 3.

Figure 3:
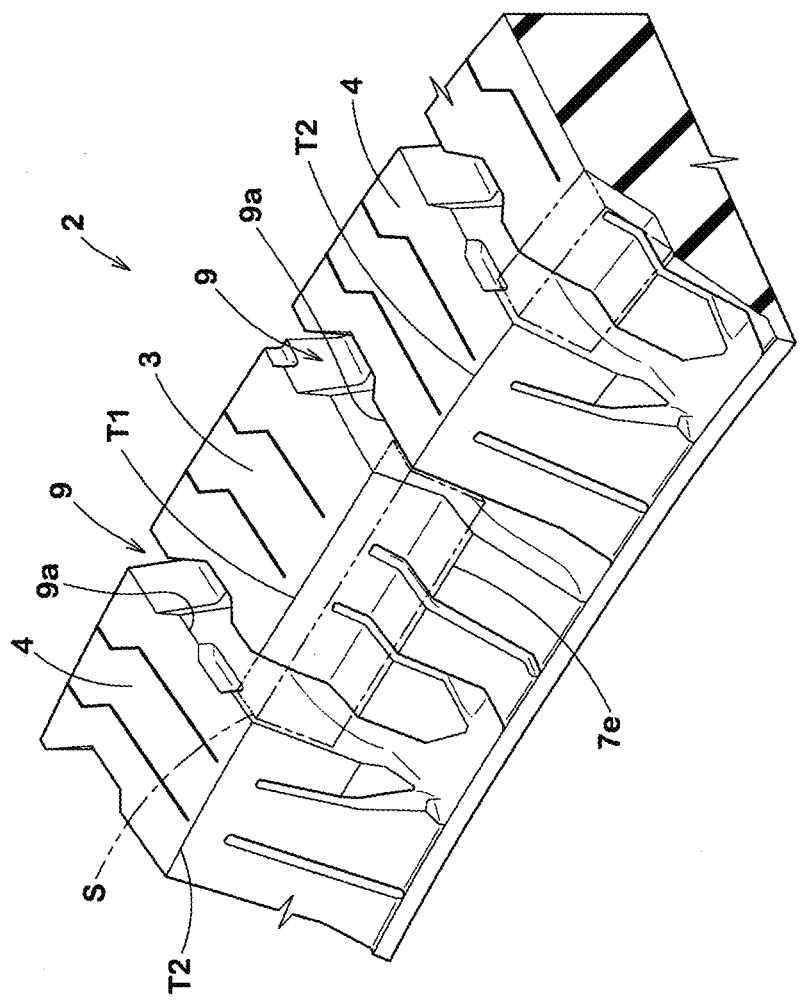
FIG. 3 is a schematic perspective view of the first shoulder block and a second shoulder block.

FIG. 3 is a schematic perspective view of the first shoulder block 3 and the second shoulder block 4. As shown in FIG. 3, in the tread portion 2 of the present embodiment, a large snow column S can be formed between the second shoulder blocks 4 and 4 adjacent to each other in the tire circumferential direction, and between the first tread end T1 and the second edge 7e. Thus, the snow column S can be sheared at a groove wall 9a of the first shoulder lateral groove 9, so that running performance on a deep snow road surface is further enhanced.

Figure 4:
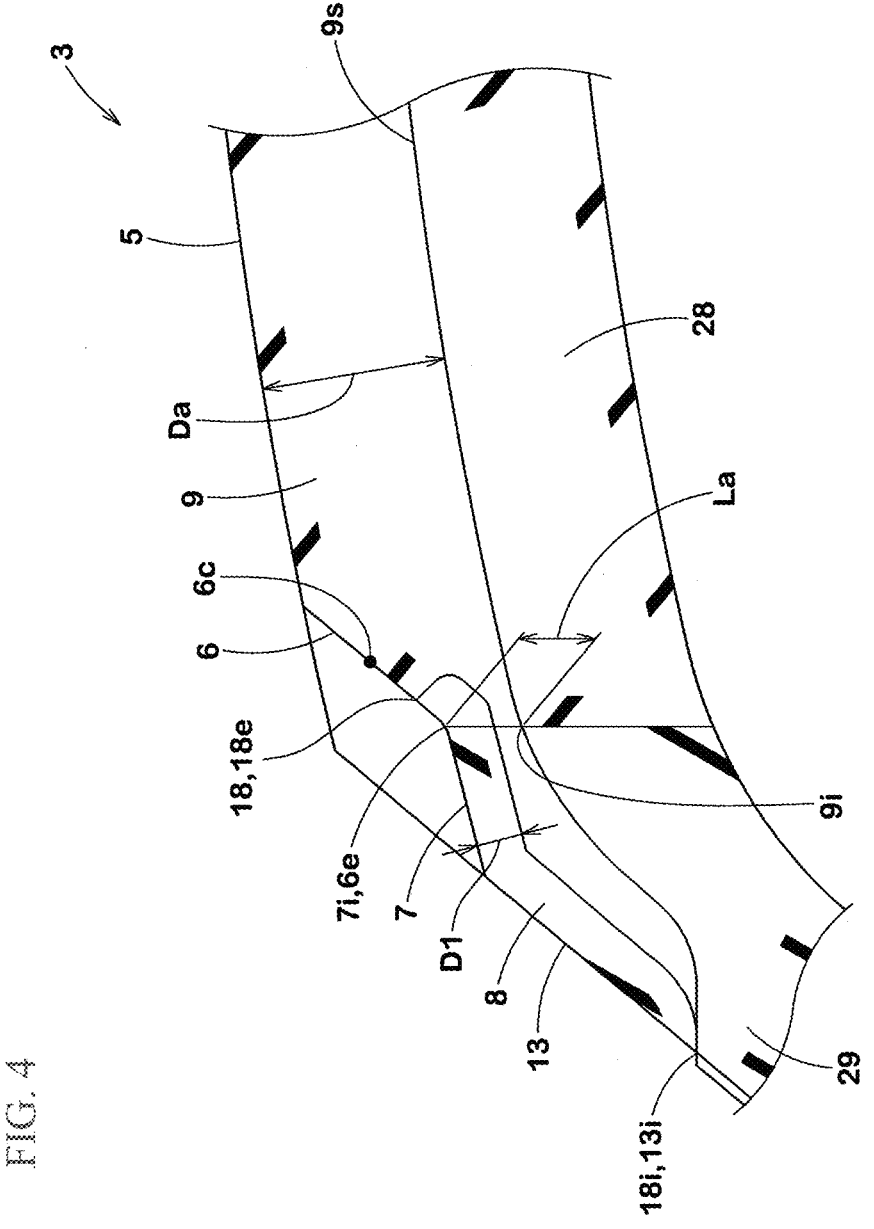
FIG. 4 is a tire meridional cross-sectional view of the first shoulder block.

FIG. 4 is a tire meridional cross-sectional view of the first shoulder block 3. As shown in FIG. 4, in the present embodiment, the second tread surface 7 is disposed outward of a groove bottom 9s of the first shoulder lateral groove 9 in the tire radial direction. The second tread surface 7 having such a structure can compress snow more densely during running on a deep snow road surface. At a position of an inner end 7i (first edge 6e) of the second tread surface 7 in the tire axial direction, a distance La in the tire radial direction between a groove bottom 9i of the first shoulder lateral groove 9 and the inner end 7i is, but is not particularly limited to, preferably 0.5 mm or more and more preferably 1 mm or more, and preferably 5 mm or less and more preferably 4 mm or less. For example, a groove depth Da of the first shoulder lateral groove 9 is preferably 8 mm or more and more preferably 10 mm or more, and preferably 18 mm or less and more preferably 16 mm or less. In the description herein, the groove depth refers to a length in the direction normal to the tread surface 5.

Figure 5:
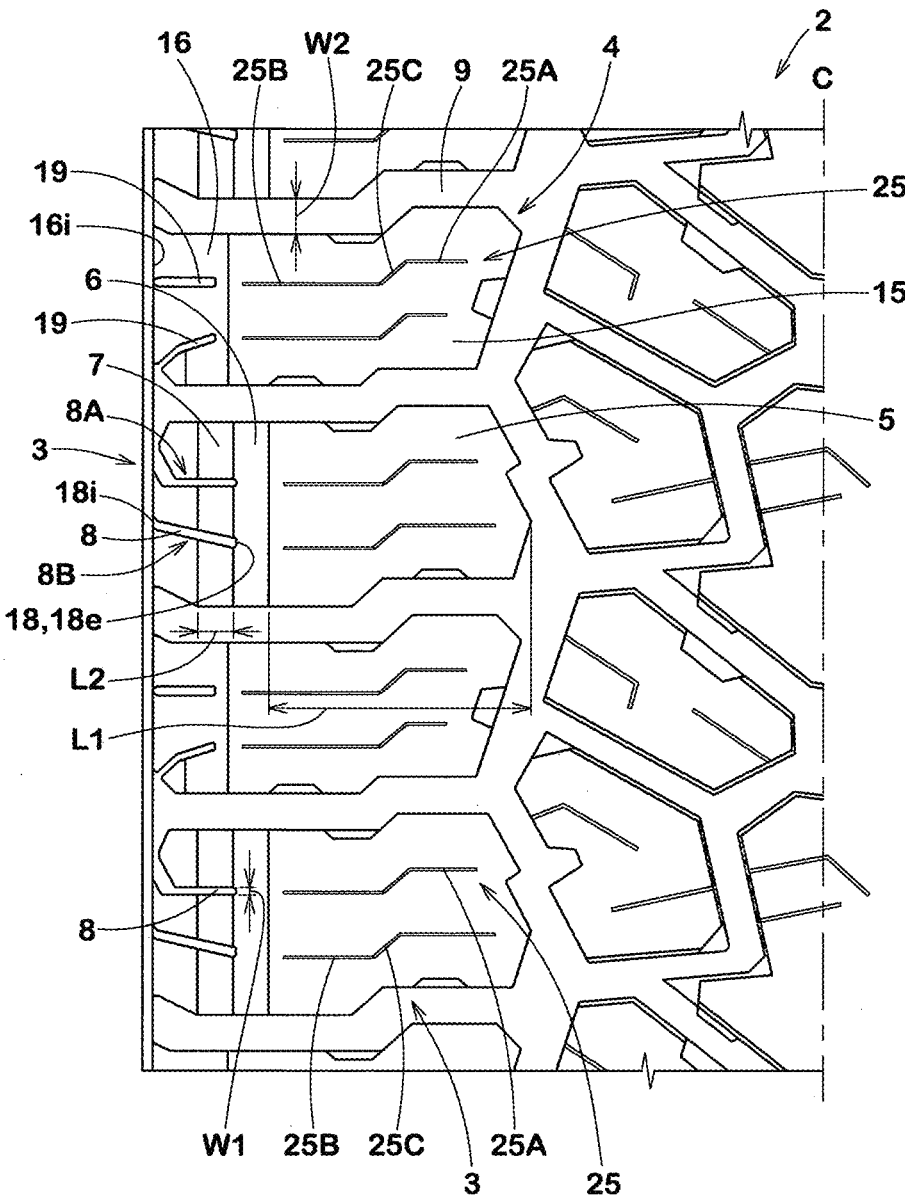
FIG. 5 is a development of a left half of the tread portion.

FIG. 5 is a development of a left half of the tread portion 2. As shown in FIG. 5, a length L2 of the second tread surface 7 in the tire axial direction is preferably 18% or more of a length L1 of the first tread surface 5 of the first shoulder block 3 in the tire axial direction and more preferably 20% or more thereof, and preferably 23% or less thereof and more preferably 21% or less thereof. Since the length L2 of the second tread surface 7 is 18% or more of the length L1 of the first tread surface 5, an effect of enhancing a snow column shearing force at the second tread surface 7 is exhibited. Since the length L2 of the second tread surface 7 is 23% or less of the length L1 of the first tread surface 5, the length L1 of the first tread surface 5 is maintained, and damage such as wear and chipping is inhibited from occurring at the first shoulder block or the second shoulder block 4.

The groove 8 extends in the tire axial direction. Thus, the groove 8 having a component in the tire axial direction allows enhancement of a snow column shearing force. The groove 8 preferably extends in the tire axial direction at least on the second tread surface 7.

A plurality of the grooves 8 are disposed in the second tread surface 7. In the present embodiment, two grooves 8 are disposed in the second tread surface 7. The groove 8 includes a first groove 8A extending on the second tread surface 7 in parallel with the tire axial direction, and a second groove 8B extending on the second tread surface 7 so as to be inclined relative to the tire axial direction. The groove 8 having such a structure allows stiffness of the second tread surface 7 to be appropriately reduced and allows deformation during contact with deep snow to be increased, and contributes to compressing snow more densely.

As shown in FIG. 4 and FIG. 5, the groove 8 has an end portion 18 terminating in the first side surface 6. In the present embodiment, the groove 8 has an outer end portion (outer-side end portion) 18e in the tire radial direction at the first side surface 6. For example, the outer end portion 18e is disposed tire-radially inward of a mid-point 6c of the first side surface 6 in the tire radial direction. The groove 8 has an inner end portion (inner-side end portion) 18i, in the tire radial direction, which terminates in the second side surface 13. For example, the inner end portion 18i is disposed at an inner end 13i of the second side surface 13 in the tire radial direction. Thus, in the present embodiment, the groove 8 extends across the second tread surface 7. Thus, the groove 8 allows a relatively large snow column to be formed, so that high traction can be generated.

A groove width W1 of the groove 8 is not particularly limited, but is preferably less than a groove width W2 of the first shoulder lateral groove 9. If the groove width W1 of the groove 8 is excessively small, a snow column formed in the groove 8 becomes small, and a snow column shearing force may be reduced. Meanwhile, if the groove width W1 of the groove 8 is great, a surface at which deep snow is compressed by the second tread surface 7 becomes small. From such viewpoints, the groove width W1 of the groove 8 is preferably 1.5 mm or more and more preferably 2.0 mm or more, and is preferably 3.5 mm or less and more preferably 3.0 mm or less. From the same viewpoints, a groove depth D1 of the groove 8 is preferably 15% or more of a groove depth Da of the first shoulder lateral groove 9 and more preferably 20% or more thereof, and is preferably 35% or less thereof and more preferably 30% or less thereof.

In the second shoulder block 4, a second groove 19 extends in the tire axial direction at the third side surface 16. In the present embodiment, two second grooves 19 are disposed in the third side surface 16. Such second grooves 19 allow stiffness of the second shoulder block 4 to be appropriately reduced and allow the second shoulder block 4 to be deformed. Therefore, deep snow embedded in the first shoulder lateral groove 9 is easily removed. For example, the second groove 19 is connected to an inner end 16i of the third side surface 16 in the tire radial direction. In the present embodiment, the second groove 19 preferably has a groove width and a groove depth that are equivalent to the groove width W1 and the groove depth D1, respectively, of the groove 8.

In each of the first shoulder block 3 and the second shoulder block 4, sipes 25 extend in the tire axial direction. Each sipe 25 is disposed in the first tread surface 5 or the third tread surface 15. Each sipe 25 includes a first sipe portion 25A disposed on the tire equator C side, a second sipe portion 25B disposed on the first tread end T1 side, and a third sipe portion 25C connecting between the first sipe portion 25A and the second sipe portion 25B. In the present embodiment, the first sipe portion 25A extends in parallel with the first lateral groove portion 9A. For example, the second sipe portion 25B extends in parallel with the second lateral groove portion 9B. In the present embodiment, the third sipe portion 25C extends in parallel with the third lateral groove portion 9C. In the description herein, the "extend in parallel" means that the absolute value of a difference between an angle of each of the lateral groove portions 9A to 9C relative to the tire axial direction and an angle of each of the sipe portions 25A to 25C relative to the tire axial direction, respectively, is 5° or less, and, in the present embodiment, the absolute value is 0°. In the description herein, the sipe represents a cut portion having a width of less than 1.5 mm, and is clearly distinguished from a groove having a width of 1.5 mm or more.

As shown in FIG. 1, for example, the middle block 12 includes a first middle block 12A disposed inward of the first shoulder block 3 in the tire axial direction, and a second middle block 12B disposed inward of the second shoulder block 4 in the tire axial direction.

In the present embodiment, the crown block 11 and the middle block 12 each have a plurality of sipes 26. Thus, the crown block 11 and the middle block 12 are inhibited from having excessively high stiffness, and deformation is increased during contact with deep snow, and an effect of the crown block 11 and the middle block 12 for densely compressing deep snow becomes high.

In general, deformation of rubber having low rubber hardness is relatively great during contact with the ground in running, so that deep snow can be effectively compressed, and a snow column shearing force can be enhanced. Meanwhile, if rubber hardness is excessively low, damage to the rubber such as chipping and wear is likely to occur. Therefore, as shown in FIG. 4, the first shoulder block 3 includes a first rubber portion 28 including the first tread surface 5 and a second rubber portion 29 including the second tread surface 7, and the rubber hardness of the second rubber portion 29 is preferably less than or equal to the rubber hardness of the first rubber portion 28. The rubber hardness of the second rubber portion 29 is more preferably less than the rubber hardness of the first rubber portion 28 in order to enhance a snow column shearing force in the second tread surface 7, and reduce damage to the first tread surface 5. For example, the rubber hardness of the first rubber portion 28 is, but is not particularly limited to, 60 to 75 degrees. For example, the rubber hardness of the second rubber portion 29 is 40 to 55 degrees. In the description herein, the rubber hardness is a durometer A hardness measured in the environment of 23° C. by a type A durometer based on JIS-K6253.

Figure 6A:
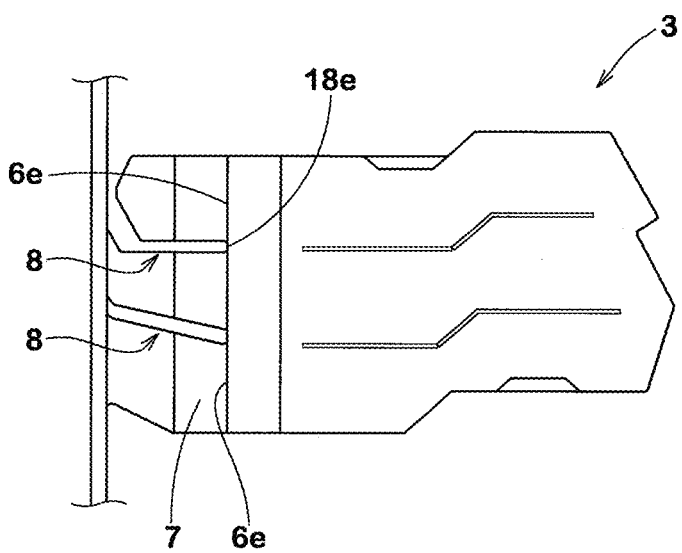
FIG. 6A is a development of a first shoulder block according to another embodiment.
Figure 6B:
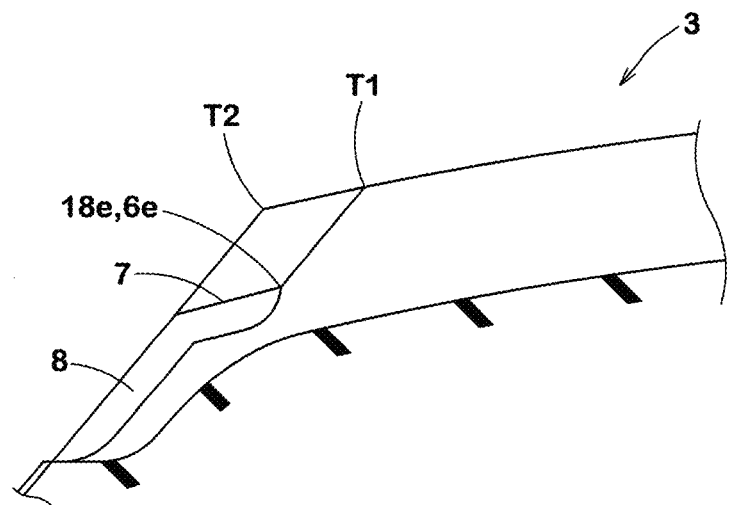
FIG. 6B is a tire meridional cross-sectional view of the first shoulder block shown in FIG. 6A.

FIG. 6A is a development of the first shoulder block 3 according to another embodiment. FIG. 6B is a tire meridional cross-sectional view of the first shoulder block 3 shown in FIG. 6A. The groove 8 has an end portion 18 terminating in the second tread surface 7. The groove 8 has an outer end portion (outer-side end portion) 18e, in the tire radial direction, which terminates in the second tread surface 7. At the snow column formed by such a groove 8, a force is inhibited from escaping when snow is compressed. Therefore, traction can be maintained to be high. The outer end portion 18e of the groove 8 is disposed at the first edge 6e.

Although the particularly preferred embodiments of the present invention have been described above in detail, the present invention is not limited to the illustrated embodiments, and various modifications can be made to implement the present invention.

EXAMPLES

A tire having the basic pattern shown in FIG. 1 was produced as a test tire based on the specifications indicated in Table 1. The running performance of each test tire on a deep snow road surface was tested. Specifications common to the test tires, and the test method were as follows. In Tables 1 and 2, "A" in "Shape of groove" means that the groove extended from the first side surface to the second tread surface (second edge). "– (negative)" in "Distance La (mm)" indicates that the second tread surface was disposed inward of the groove bottom of the first shoulder lateral groove in the tire radial direction. Furthermore, the groove depth of the first shoulder lateral groove was 14 mm in Comparative examples 1 to 3, and Examples 1 to 7, 9, and 10, and was 12 mm in Example 8.

Tire size: LT275/70R18

Rim: 8.0 J

Internal pressure: 420 kPa (front wheel), 520 kPa (rear wheel)

<Running Performance on Deep Snow Road Surface>

Traction (frictional force) acting on the test tire on a deep snow road surface was measured when the following vehicle was caused to run with the tire at the following speed in accordance with a test method in the standard of ASTM F1805. The result is indicated as an index with the traction of Example 1 being 10. The greater the value is, the better the running performance on the deep snow road surface is.

Vehicle: four-wheel-drive passenger car (pickup truck) having an engine displacement of 6000 cc Running speed: 8 km/h

TABLE 1

|  | Comp. Ex. 1 | Ex. 1 | Ex. 2 | Ex. 3 | Ex. 4 | Ex. 5 | Comp. Ex. 2 |
|---|---|---|---|---|---|---|---|
| Presence or absence of second tread surface | absent | present | present | present | present | present | present |
| Angle $\theta$ (°) | — | 0 | 10 | 0 | 0 | 0 | 20 |
| Presence or absence of groove | — | present | present | present | present | present | present |
| Shape of groove | — | A | A | FIG. 1, FIG. 2 | A | A | A |
| Distance La (mm) | — | 1 | 1 | 1 | 4 | 1 | 1 |
| Rubber hardness (°) of first rubber portion | 67 | 67 | 67 | 67 | 67 | 67 | 67 |
| Rubber hardness (°) of second rubber portion | — | 47 | 47 | 47 | 47 | 67 | 47 |
| Running performance on deep snow road surface [Index: the greater the value is, the better the performance is] | 6 | 10 | 9 | 10 | 10 | 8 | 6 |

TABLE 2

|  | Comp. Ex. 3 | Ex. 6 | Ex. 7 | Ex. 8 | Ex. 9 | Ex. 10 |
|---|---|---|---|---|---|---|
| Presence or absence of second tread surface | present | present | present | present | present | present |
| Angle $\theta$ (°) | 0 | 0 | 0 | 0 | 0 | 0 |
| Presence or absence of groove | absent | present | present | present | present | present |
| Shape of groove | — | FIGS. 6A-6B | A | A | A | A |
| Distance La (mm) | 1 | 1 | −1 | −1 | 1 | 1 |
| Rubber hardness (°) of first rubber portion | 67 | 67 | 67 | 67 | 67 | 45 |
| Rubber hardness (°) of second rubber portion | 47 | 47 | 47 | 47 | 68 | 47 |
| Running performance on deep snow road surface [Index: the greater the value is, the better the performance is] | 6 | 7 | 7 | 8 | 7 | 13 |

According to the test results, it was confirmed that the tires of the examples exhibited excellent running performance on a deep snow road surface as compared with the tires of the comparative examples. Furthermore, the test was performed by using tires having a different tire size. The same results were indicated. Moreover, the tires of the examples maintained high steering stability, wear resistance, and chipping resistance.

APPENDIXES

The present invention has the following aspects.

Invention 1

A tire including a tread portion, in which
the tread portion includes a first tread end, and at least one first shoulder block including the first tread end,
the first shoulder block includes
a first tread surface extending inward from the first tread end in a tire axial direction,
a first side surface extending inward from the first tread end in a tire radial direction, and
a second tread surface extending outward from the first side surface in the tire axial direction,
the second tread surface extends at an angle of 10° or less relative to a contact line extending in contact with the first tread surface through the first tread end, on a tire meridional cross section of the first shoulder block, and
at least one groove is disposed in the second tread surface.

Invention 2

The tire according to Invention 1, in which
the tread portion includes a first shoulder lateral groove that is disposed adjacent to the first shoulder block and extends in the tire axial direction, and
the second tread surface is disposed outward of a groove bottom of the first shoulder lateral groove in the tire radial direction.

Invention 3

The tire according to Invention 1 or 2, in which the groove has an end portion that terminates in the second tread surface.

Invention 4

The tire according to Invention 1 or 2, in which the groove has an end portion that terminates in the first side surface.

Invention 5

The tire according to any one of Inventions 1 to 4, in which the groove extends in the tire axial direction.

Invention 6

The tire according to any one of Inventions 1 to 5, in which a plurality of the grooves are disposed in the second tread surface.

Invention 7

The tire according to any one of Inventions 1 to 6, in which the groove has a width of 1.5 to 3.5 mm.

Invention 8

The tire according to any one of Inventions 1 to 7, in which a length of the second tread surface in the tire axial direction is 18% to 23% of a length of the first tread surface of the first shoulder block in the tire axial direction.

Invention 9

The tire according to Invention 8, in which
the first shoulder block includes a first rubber portion including the first tread surface and a second rubber portion including the second tread surface, and
a rubber hardness of the second rubber portion is less than or equal to a rubber hardness of the first rubber portion.

Invention 10

The tire according to Invention 9, in which the rubber hardness of the second rubber portion is less than the rubber hardness of the first rubber portion.

Invention 11

The tire according to any one of Inventions 1 to 10, in which
the tread portion includes a second tread end disposed outward of the first tread end in the tire axial direction, and a second shoulder block including the second tread end, and
the first shoulder block and the second shoulder block alternate in a tire circumferential direction.

What is claimed is:
1. A tire comprising:
a tread portion including a first tread end, and at least one first shoulder block including the first tread end,
the first shoulder block includes
a first tread surface extending inward from the first tread end in a tire axial direction,
a first side surface extending inward from the first tread end in a tire radial direction, and
a second tread surface extending outward from the first side surface in the tire axial direction,
an edge formed at a point at which the first side surface and the second tread surface intersect each other,
the second tread surface extends at an angle of 10° or less relative to a contact line extending in contact with the first tread surface through the first tread end, on a tire meridional cross section of the first shoulder block, and
at least one groove is in the second tread surface,
wherein a length of the second tread surface in the tire axial direction is 18% to 23% of a length of the first tread surface of the first shoulder block in the tire axial direction.
2. The tire according to claim 1, wherein
the tread portion includes a first shoulder lateral groove that is adjacent to the first shoulder block and extends in the tire axial direction, and
the second tread surface is outward of a groove bottom of the first shoulder lateral groove in the tire radial direction.
3. The tire according to claim 1, wherein
the groove has an end portion that terminates in the second tread surface.
4. The tire according to claim 1, wherein
the groove has an end portion that terminates in the first side surface.

5. The tire according to claim 1, wherein the groove extends in the tire axial direction.

6. The tire according to claim 1, wherein the at least one groove includes a plurality of the grooves in the second tread surface.

7. The tire according to claim 1, wherein the groove has a width of 1.5 to 3.5 mm.

8. The tire according to claim 1, wherein the first shoulder block includes a first rubber portion including the first tread surface and a second rubber portion including the second tread surface, and a rubber hardness of the second rubber portion is less than or equal to a rubber hardness of the first rubber portion.

9. The tire according to claim 8, wherein the rubber hardness of the second rubber portion is less than the rubber hardness of the first rubber portion.

10. The tire according to claim 1, wherein the tread portion includes a second tread end outward of the first tread end in the tire axial direction, and a second shoulder block including the second tread end, and the first shoulder block and the second shoulder block alternate in a tire circumferential direction.

11. The tire according to claim 7, wherein the tread portion further includes a first shoulder lateral groove extending outward in the tire axial direction beyond the first tread end and is adjacent to the first side surface and the second tread surface in the tire circumferential direction;

the width of the groove is within 2.0 mm and 3.0 mm, and a ratio of the depth of the groove to the depth of the first shoulder lateral groove is within 20% and 30%.

12. A tire comprising:

a tread portion including a first tread end, and at least one first shoulder block including the first tread end, the first shoulder block includes a first tread surface extending inward from the first tread end in a tire axial direction, a first side surface extending inward from the first tread end in a tire radial direction, and a second tread surface extending outward from the first side surface in the tire axial direction, the second tread surface extends at an angle of 10° or less relative to a contact line extending in contact with the first tread surface through the first tread end, on a tire meridional cross section of the first shoulder block, and at least one groove is in the second tread surface, wherein the groove has an outer end portion in the tire radial direction radially inward of a mid-point of the first side surface in the tire radial direction; and no groove is formed on a portion of the first side surface that is outward of the mid-point in the tire radial direction.

13. The tire according to claim 12, wherein the tread portion further includes a first shoulder lateral groove extending outward in the tire axial direction beyond the first tread end and is adjacent to the first side surface and the second tread surface in the tire circumferential direction;

the width of the groove is within 2.0 mm and 3.0 mm, and a ratio of the depth of the groove to the depth of the first shoulder lateral groove is within 20% and 30%.

14. A tire comprising:

a tread portion including a first tread end, and at least one first shoulder block including the first tread end, the first shoulder block includes a first tread surface extending inward from the first tread end in a tire axial direction, a first side surface extending inward from the first tread end in a tire radial direction, and a second tread surface extending outward from the first side surface in the tire axial direction, the second tread surface extends at an angle of 10° or less relative to a contact line extending in contact with the first tread surface through the first tread end, on a tire meridional cross section of the first shoulder block, a plurality of grooves is formed in the second tread surface, and a length of the second tread surface in the tire axial direction is 18% to 23% of a length of the first tread surface of the first shoulder block in the tire axial direction.

15. The tire according to claim 14, wherein a sipe is formed in the first tread surface and the sipe faces the grooves formed in the second tread surface.

* * * * *